US010733452B2

(12) United States Patent
Attorre et al.

(10) Patent No.: US 10,733,452 B2
(45) Date of Patent: Aug. 4, 2020

(54) BRAND SAFETY IN VIDEO CONTENT

(71) Applicant: Adobe Inc., San Jose, CA (US)

(72) Inventors: Brunno Fidel Maciel Attorre, New York, NY (US); William Marino, New York, NY (US); Xiaozhen Xue, Woodbridge, CT (US); Nicolas Huynh Thien, San Ramon, CA (US)

(73) Assignee: Adobe Inc., San Jose, CA (US)

( * ) Notice: Subject to any disclaimer, the term of this patent is extended or adjusted under 35 U.S.C. 154(b) by 59 days.

(21) Appl. No.: 16/201,819

(22) Filed: Nov. 27, 2018

(65) Prior Publication Data

US 2020/0005046 A1 Jan. 2, 2020

Related U.S. Application Data

(60) Provisional application No. 62/693,263, filed on Jul. 2, 2018.

(51) Int. Cl.
| | |
|---|---|
| *G06K 9/00* | (2006.01) |
| *G06T 7/00* | (2017.01) |
| *G10L 15/18* | (2013.01) |
| *G10L 15/22* | (2006.01) |

(52) U.S. Cl.
CPC ..... *G06K 9/00744* (2013.01); *G06K 9/00718* (2013.01); *G06T 7/0002* (2013.01); *G10L 15/1815* (2013.01); *G10L 15/22* (2013.01); *G06K 2209/01* (2013.01); *G06K 2209/25* (2013.01); *G06K 2209/27* (2013.01); *G06T 2207/10016* (2013.01); *G06T 2207/20081* (2013.01)

(58) Field of Classification Search
CPC .......... G06K 9/00744; G06K 9/00718; G06K 2209/25; G06K 2209/01; G06K 2209/27; G06T 7/0002; G06T 2207/20081; G06T 2207/10016; G10L 15/1815; G10L 15/22
See application file for complete search history.

(56) References Cited

PUBLICATIONS

Amazon, "AWS Lambda, Run Code Without Thinking About Servers. Pay for the Compute Time you Consume", https://aws.amazon.com/lambda/, 2019, 13 pages.
Data Council "Video Understanding at Scale: Deep Learning in a Serverless Infrastructure", https://www.datacouncil.ai/talks/video-understanding-at-scale-deep-learning-in-a-serverless-infrastructure, accessed 2019, 5 pages.
Youtube "Dear Kitten", https://www.youtube.com/watch?v=G4Sn91t1V4g, Jun. 5, 2014, 3 pages.

*Primary Examiner* — Christopher Wait
(74) *Attorney, Agent, or Firm* — Kilpatrick Townsend & Stockton LLP (57) ABSTRACT

Disclosed herein are techniques for determining brand safety of a video including image frames and audio content. In some embodiments, frame-level features, scene-level features, and video-level features are extracted by a set of frame-level models, a set of scene-level models, and a set of video-level models, respectively. Outputs from lower level models are used as inputs for higher level models. A brand safety score indicating whether it is safe to associate a brand with the video is determined based on the outputs from the set of video-level models. In some embodiments, commercial content associated with the brand is insert into the video that is determined to be safe for the brand.

20 Claims, 8 Drawing Sheets

BRAND SAFETY IN VIDEO CONTENT

CROSS REFERENCE TO RELATED APPLICATIONS

The present application claims the benefit of and priority to U.S. Provisional Patent Application No. 62/693,263, filed on Jul. 2, 2018, entitled "Brand Safety In Video Content," the content of which is herein incorporated by reference in its entirety for all purposes.

BACKGROUND

Enormous amount of video and image data is generated and shared every day, thanks to the ubiquity of digital cameras and Internet applications such as social networks. Video and image data constitutes a large portion of Internet content. Video is one of the most complex media formats available in the digital age. A video generally includes at least one audio track, some metadata, and thousands of image frames. With the overwhelmingly large amount of video data available, a need to automatically understand such massive amounts of data has risen. For example, some videos may include content that may not be appropriate for certain groups of people, such as content including nudity, violence, extremist, firearms, alcohol, or tobacco, and thus may not be suitable for associating with certain commercial content. By understanding the content of the video, one may determine whether the video is "brand safe" and therefore is suitable for monetizing, such as incorporating commercial content associated with a brand.

SUMMARY

Embodiments of the present disclosure are directed to, among other things, techniques for determining a safety level of a video for associating a brand with the video. According to certain embodiments, a video brand safety determination technique is disclosed. The video brand safety determination technique can be used to determine a brand safety score for a video, which is used to determine whether it is safe to associate a brand with the video. Various inventive embodiments are described herein, including methods, systems, non-transitory computer-readable storage media storing programs, code, or instructions executable by one or more processors, and the like.

In one embodiment, a method includes obtaining a video that includes a plurality of scenes each including a plurality of video frames, extracting frame-level features from each of two or more video frames in each scene of the plurality of scenes using a first set of models implemented by the one or more processing devices, generating scene-level features for each scene of the plurality of scenes using a second set of models implemented by the one or more processing devices based on the frame-level features extracted from the two or more video frames in each scene of the plurality of scenes, generating video-level features in the video using a third set of models implemented by the one or more processing devices based on the scene-level features generated for each scene of the plurality of scenes, and determining a brand safety score for the video based on the video-level features, where the brand safety score indicates whether it is safe to associate a brand with the video. In some embodiments, the method also includes determining that it is safe to associate the brand with the video based on determining that the brand safety score is greater than a threshold value, and inserting content associated with the brand into the video.

According to certain embodiments, a system includes a processing device and a non-transitory computer-readable medium communicatively coupled to the processing device. The processing device is configured to execute program code stored in the non-transitory computer-readable medium and thereby perform operations including obtaining a video that includes a plurality of scenes each including a plurality of video frames, extracting frame-level features from each of two or more video frames in each scene of the plurality of scenes using a first set of models implemented by the one or more processing devices, generating scene-level features for each scene of the plurality of scenes using a second set of models implemented by the one or more processing devices based on the frame-level features extracted from the two or more video frames in each scene of the plurality of scenes, generating video-level features in the video using a third set of models implemented by the one or more processing devices based on the scene-level features generated for each scene of the plurality of scenes, and determining a brand safety score for the video based on the video-level features, where the brand safety score indicates whether it is safe to associate a brand with the video. In some embodiments, the operations also include determining that it is safe to associate the brand with the video based on determining that the brand safety score is greater than a threshold value, and inserting content associated with the brand into the video.

According to certain embodiments, a system includes means for obtaining a video that includes a plurality of scenes each including a plurality of video frames, means for extracting frame-level features from each of two or more video frames in each scene of the plurality of scenes using a first set of models implemented by one or more processing devices, means for generating scene-level features for each scene of the plurality of scenes using a second set of models implemented by the one or more processing devices based on the frame-level features extracted from the two or more video frames in each scene of the plurality of scenes, means for generating video-level features in the video using a third set of models implemented by the one or more processing devices based on the scene-level features generated for each scene of the plurality of scenes, and means for determining a brand safety score for the video based on the video-level features, where the brand safety score indicates whether it is safe to associate a brand with the video. In some embodiments, the system also includes means for inserting content associated with the brand into the video based on determining that the brand safety score is greater than a threshold value.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE DRAWINGS

Illustrative embodiments are described in detail below with reference to the following figures.

DETAILED DESCRIPTION

Techniques disclosed herein relate generally to "brand safety," and more specifically, to determining whether it is safe to associate a brand with a video using machine learning techniques.

Some videos may include content that may not be appropriate for certain groups of people, such as content including nudity, violence, extremist, firearms, alcohol, or tobacco. Thus, it may not be appropriate to associate at least some brands with these videos because associating brands with these videos may adversely affect the brands. According to certain embodiments, a brand safety level of a video is determined by considering the audio track, the metadata text, and the image frames included in the video individually and collectively. Deep learning and natural language processing (NLP) models are applied to video data at various hierarchical levels in a video individually and collectively to determine the brand safety level of the video.

In some embodiments, features in different levels, such as frame-level features, scene-level features, and video-level features, are extracted from an input video. For example, frame-level features can be extracted from the image and text content in each individual frame of the video using a set of frame-level models and functions. The scene-level features for a scene can be extracted or generated from the combined outputs of the frame-level models for video frames and the audio data in the scene using a set of scene-level models. The video-level features may be extracted or generated from combined outputs of the scene-level models for the scenes in the video using a set of video-level features. The outputs of the set of video-level models are then combined by a model to determine an overall brand safety score for the video.

Techniques disclosed herein analyze the visual, audio, and textual content of a video holistically and individually at different levels of granularity, and thus can gain a much deeper and thorough understanding of the video content compared with techniques that only consider certain components (e.g., individual image frames) of the video content. In addition, various sets of targeted machine learning-based models for different features are used to analyze the video content at different levels of granularity and thus can achieve a better accuracy in the analysis than using a single model. Furthermore, a quantitative (rather than qualitative) score can be generated based on the analysis to facilitate user decision regarding the brand safety of videos.

The following examples are provided to introduce certain embodiments. In the following description, for the purposes of explanation, specific details are set forth in order to provide a thorough understanding of examples of the disclosure. However, it will be apparent that various examples can be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

As described above, a video is not just made of images without sound or sound without images. Although a challenging task, considering different components in a video individually and holistically can help to gain a much deeper understanding of the video: its objects, themes, production quality, tone, sentiment, etc. One reason to understand what is inside the video content is to determine if the video content is "brand safe" and, therefore, suitable for monetizing and serving advertisements against. Although such an analysis is, by its nature, always subjective, a video's brand safety level can often be predicted by the presence (or absence) of certain objects, themes, and language in the video. For instance, a video with graphic images of violence and gore can generally be labelled as "unsafe" due to the presence of such content inside the video.

Machine learning technologies use a large dataset including positive and/or negative data points to train a model (e.g., a neural network) to identify certain patterns in data (e.g., images). The trained machine learning model can then be used to make inferences on new data points. In order for a machine learning model to make a correct inference from new input data, the same type of data may be used to train the model. For example, by feeding a machine learning model with a large number of pictures with cats and a large number of pictures without cats, one can tune the machine learning model to recognize cats in images. Deep learning is a branch of machine learning that uses deep neural networks for tasks such as object detection and classification. In general, the more data is used to train the models, the more intelligent the model may get to produce better results.

Techniques disclosed herein use custom trained machine learning models to analyze the visual, audio, and textual content of a video at the frame level, scene level, and video level, and extract potential brand unsafe items from the video. The machine learning models can be trained using open source datasets, proprietary datasets, synthetically generated datasets, or any combination thereof. A variety of open source datasets may be used. The proprietary datasets may include, for example, nudity images, violence images, firearms images, IAB Tier-1 and Tier-2 annotated video datasets, sentiment annotated text datasets, activity extraction datasets, logo imagery datasets, object detection datasets, and the like. In some embodiments, some pre-trained models may be used for transfer learning.

Figure 1:
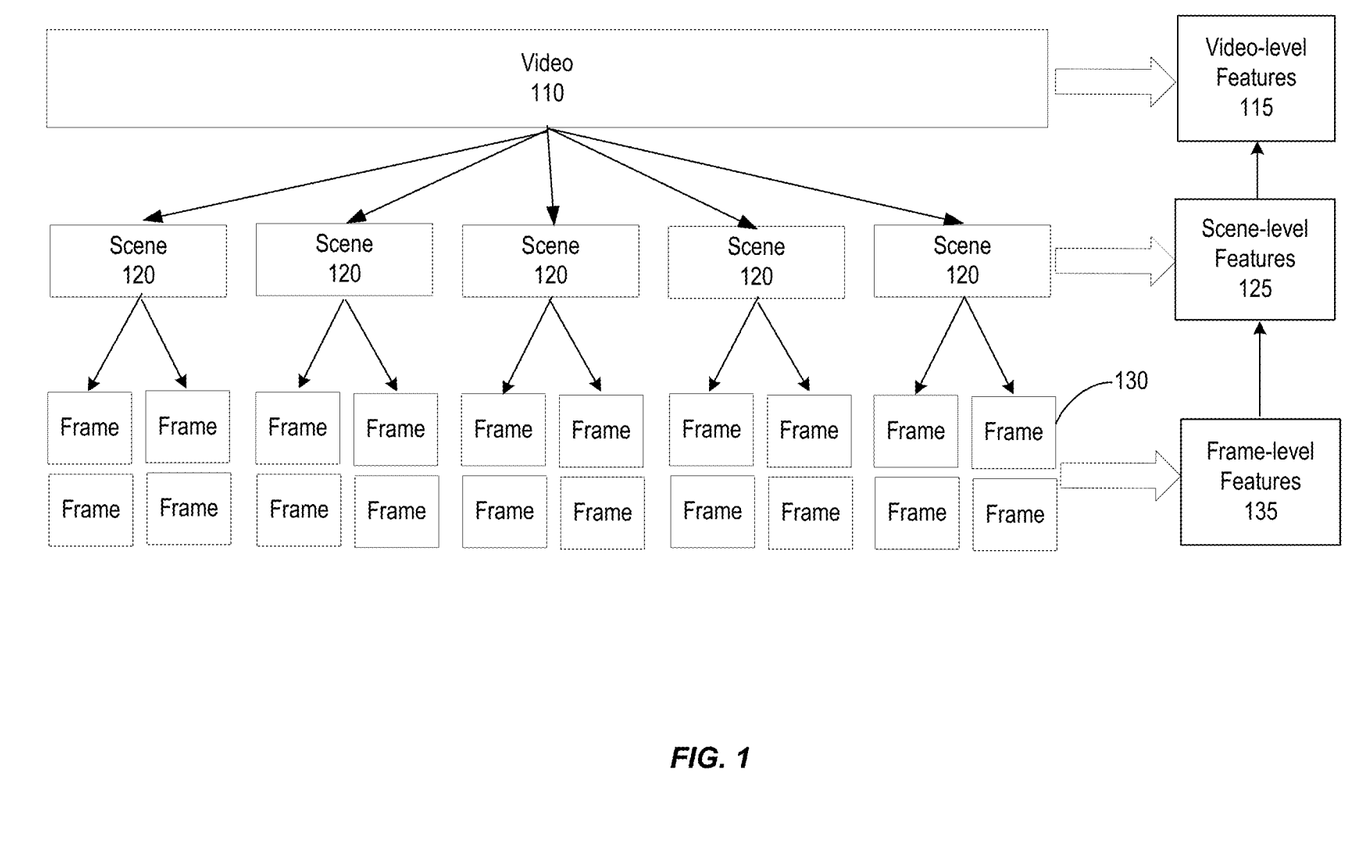
FIG. 1 illustrates various levels of features that can be extracted from various levels of video data in a video according to certain embodiments.

FIG. 1 illustrates various levels of features that can be extracted from a video according to certain embodiments. As described above, a video 110 generally includes at least an audio track, some metadata text, and thousands of frames 130 of image in a single file. Frames in a video can be clustered into scenes 120. Video 110 may have one or more scenes 120 through its full duration. Features in different levels, such as frame-level features 135, scene-level features 125, and video-level features 115, may be extracted from training data or new input data. The features for each of these levels can be extracted or generated using a respective set of machine learning models. The outputs of the sets of machine learning models are then be passed on to the higher level models and eventually used by a scoring model to determine the safety score for the video. In some embodiments, the process for determining brand safety of a video includes feature extraction, inference, and score composition.

Figure 2:
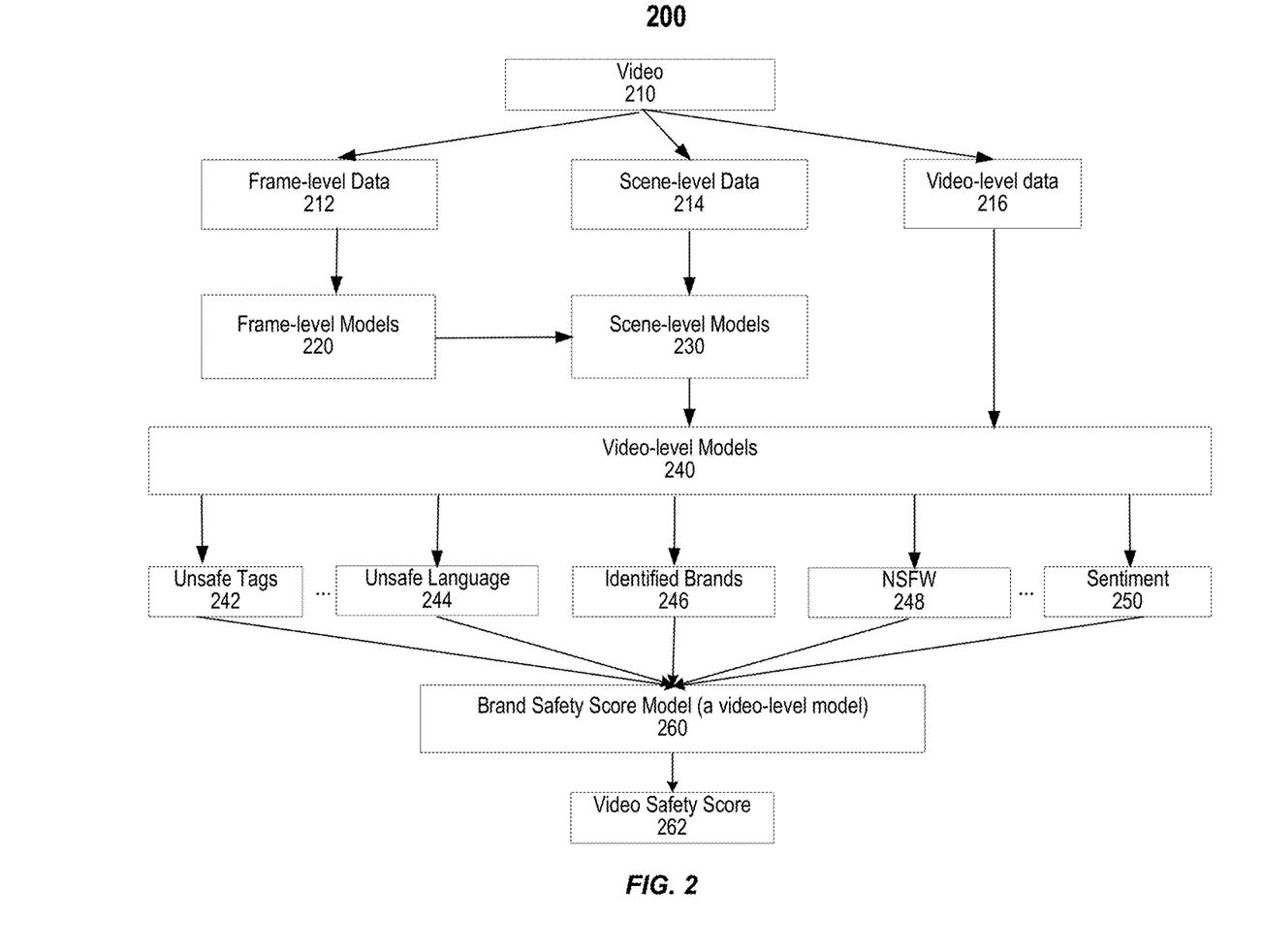
FIG. 2 is a flow chart illustrating an example of a method for determining brand safety of a video according to certain embodiments.

FIG. 2 is a flow chart 200 illustrating an example of a method for determining brand safety of a video according to certain embodiments. The method may include feature extraction from different levels of video content, detection and/or classification of various content items from the extracted features, and classification and/or scoring of the video based on the detection and/or classification of the various content items. More details of the method illustrated in FIG. 2 are described below.

Frames may be the most basic data components that can be extracted from a video file. Frames may be represented by images that, when played sequentially at a sufficiently high speed, give the illusion of animation or movement in the video. A traditional video can have, for example, an average of 24 or 30 frames (images) per second.

Frames are useful for image detection purposes. Frame-level data 212 includes video frames in the video. Analyzing each frame of a video may find objects or discrete patterns in images. In some embodiments, one video frame may be extracted from, for example, every second of video (referred to as a frame pooling rate), and the image data (e.g., a representation of the pixels in the image) of the video frame may be used to feed a set of machine learning-based frame-level models 220, such as models for object detection, logo detection, nudity detection, extreme violence (gore) detection, and combined nudity-extreme violence detection. More details of some frame-level models are described below with respect to FIG. 3.

At the frame level, textual data that may be present inside individual frames can also be extracted from the frames using, for example, optical character recognition (OCR) techniques. The text may be passed as features to another set of machine learning-based models (in a higher level) that use text as inputs, such as a topic model, an entity extraction model, a sentiment detection model, a hate speech detection model, and an unsafe language fuzzy search model.

Frames in a video can be clustered into scenes. Each scene may include a sequence of frames that compose an independent structure of the story, where each element of the structure may have a similar semantic value to each other. For example, in a movie, a scene could be a section where there is a conversation between two characters. A video may have one or more scenes through its full duration.

Scene-level data 214 may include certain types of data that the frame-level features may not have, such as audio data and time sequence data. These types of data are very useful for understanding things that require a certain context or for making sense of more than one image, such as activity recognition or theme classification.

Scene-level features can be extracted or generated by a set of scene-level models 230 from scene-level data 215 and combined frame-level features extracted from frame-level data 212 by frame-level models 220. Scene-level models 230 include, for example, aggregator functions that can aggregate results, such as detected objects, logos, brands, firearms, nudity content, violent contents, and feature vectors, extracted by frame-level models 220. In some embodiments, speech recognition may be performed on the audio data and the resultant transcript data may then be passed to a set of machine learning-based models at a higher level, such as a topic model, an entity extraction model, a sentiment detection model, a hate speech detection model, and a unsafe language fuzzy search model.

The video-level features can be extracted from video-level data 216 using video-level models 240. Video-level data 216 can include both a combination of all the scene-level and frame-level features and metadata about the video file. Video-level features can be used to estimate the overall topic of the video. In some embodiments, the frame-level, scene-level, and video-level data can be fed to their respective models to generate outputs, and the outputs may be used by video-level models to classify the video into one or more concern categories that indicate different brand safety concerns (or "red flags"), such as unsafe tags 242, unsafe language 244, identified brands 246, NSFW 248, sentiment 250, and other concern categories that are not shown in FIG. 2. The outputs from some video-level models (e.g., the classification results described above) may then be passed on to an overall brand safety score model 260 to determine the overall brand safety score 262 for the video, which can be reported to the user. In some embodiments, the outputs from some video-level models, such as the classification results described above, are also reported back to the user as part of the output of the brand safety determination.

One of the brand safety concern categories is the existence of unsafe tags, such as the appearance or mention of unsafe topics, objects, themes, and activities inside a video. To assemble data regarding the Unsafe Tags inside a video, a list of topics outputted by the topic model, a list of objects outputted by the object detection model, a list of activities outputted by the activity recognition model, a list of themes outputted by the theme recognition model, and the like may be generated.

The outputs of these models may then be compared with either a default list of unsafe tags or with a custom list of unsafe tags that the user has specified by providing custom Unsafe Tags parameters through an API. Some examples of the topics, objects, activities, and themes in the default list of unsafe tags include alcohol, drugs, firearms, natural disasters, military confrontation, extremism, sexual violence, cancer, etc. By allowing the user to provide a custom unsafe tags list, the unsafe tags in the default list may be ignored or augmented. This allows individual users or brands to specify at a higher granular level what is safe for them or their brands. If any of the unsafe tags is found (i.e., there is a match between the outputs of the models and items in the list of unsafe tags), the unsafe tags found may be provided to the users through the API. In some embodiments, different weights may be associated with different tags. In some embodiments, the user may assign custom weights to custom tags.

Another brand safety concern category is the existence of Unsafe Language, such as profanities, racial slurs, hate speech, or misogyny inside a video. As mentioned above, one type of scene-level data may be the audio transcript, which may be passed on to (among other things), for example, an unsafe language fuzzy search model that checks for profanities, racial slurs, or misogynistic terms, and a hate speech detection model that checks for more nuanced hate speeches. When there are positive results from either of these models, the video may be classified into the unsafe language concern category.

As with unsafe tags, a default list of profanities, slurs, hate speech, and misogyny to look for inside the video using the unsafe language fuzzy search model or the hate speech detection model may be maintained. In addition, as with unsafe tags, a custom list of words may be received from the user as input parameters when the user submits a video through the API. As the Unsafe language can be any words in the English language for individual users, users may dictate what words are unsafe for their brands or use cases and, therefore, which words can be included in the unsafe language fuzzy search model and consequently recognized as unsafe language.

As mentioned above, frame-level data can be passed on to a logo detection model that observes brands in the images, and an entity extraction (NLP) model that observes brands in the text embedded in the images. Any brands that are identified using these models can be aggregated and reported to the user in the Identified Brands category. As with Unsafe Tags and Unsafe Language, users can provide custom parameters and identify the brands that they view as unsafe for their use cases in a given video. For example, it may be unsafe to associate a brand with a video that includes a competitive brand. Thus, the users may provide a list of competitive brands to be identified from target videos.

As described above, frame-level data may be passed into some models, such as a nudity detection model, an extreme violence (or gore) model, and a combined nudity-extreme violence model, to determine if a given frame of a video includes nudity or extreme violence content. When any output of these models is positive, the video may be classified into the Not Safe for Work ("NSFW") brand safety concern category.

It is noted that, in some embodiments, the models may be very conservative. For example, any occurrence of nudity or extreme violence in the whole video (even with a low confidence score) may cause the whole video to be flagged as NSFW.

From the audio track in the video-level, a speech recognition system may extract the transcript and classify the sentiment for certain text in the transcript, and therefore for the whole video. In some embodiments, the sentiment can range from very negative to very positive.

In addition to providing detailed data for the brand safety concern categories as described above, techniques disclosed herein may also determine an overall brand safety score for a video based on the extracted data. For example, the brand safety score can range from 0 to 1 and can be determined by penalizing the score based on the instances of unsafe tags, unsafe language, identified brands, and NSFW materials identified in the video. If the video's sentiment is predicted to be highly negative, the score is penalized for that as well.

In some embodiments, different unsafe tags, different unsafe language words, and different NSFW materials may have different weights. For example, an NSFW tag, such as nudity, may penalize the score much more than just an alcohol bottle appearing on screen. In some embodiments, a proprietary system of weights may be developed and used.

Figure 3:
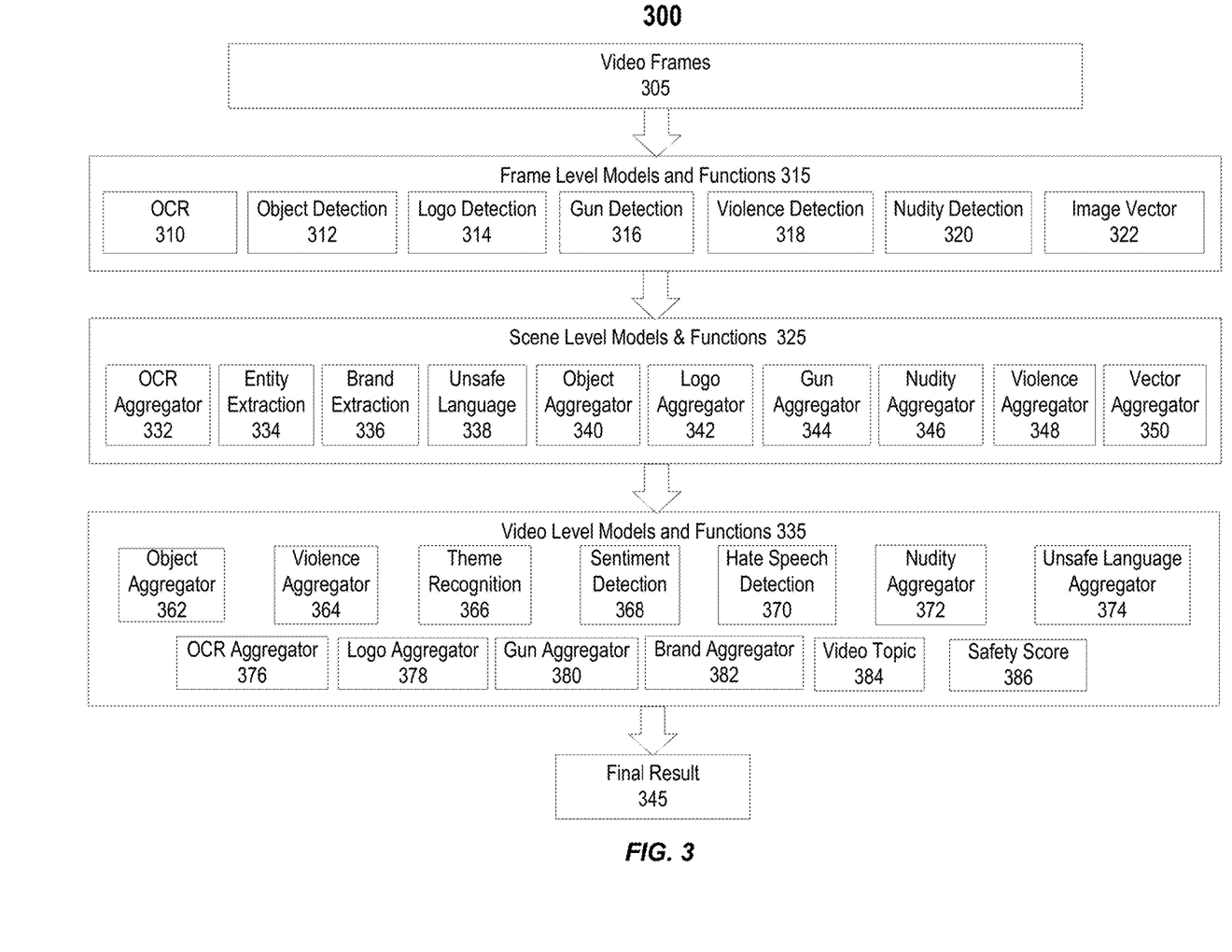
FIG. 3 illustrates an example of a brand safety determination system including various models for features at various hierarchical levels according to certain embodiments.

FIG. 3 illustrates an example of a brand safety determination system 300 including various models for video data at various hierarchical levels according to certain embodiments. Brand safety determination system 300 can be used to implement the method for determining video brand safety described above with respect to FIG. 2. In the example shown in FIG. 3, brand safety determination system 300 includes a plurality of frame-level models and functions 315, a plurality of scene-level models and functions 325, and a plurality of video-level models and functions 335. Each model or function of frame-level models and functions 315 generally takes an image frame as an input and extracts certain features or identifies certain features (e.g., objects or entities) from the image frame. Each model or function of scene-level models and functions 325 generally takes outputs from frame-level models and functions 315 and/or scene-level video data (e.g., audio data and time sequence data) as inputs, and aggregates or otherwise generates scene-level features. Each model or function of video-level models and functions 335 in turn takes outputs from scene-level models and functions 325 and/or video-level video data (e.g., audio data and time sequence data) as inputs, and aggregates or otherwise generates video-level features including, for example, a list of unsafe components in the video and a safety score for the video.

As described above, a video generally includes at least one audio track, some metadata text, and hundreds or thousands of video frames. Frame-level models and functions 315 can use video frames 305 to extract or identify certain features in the video. As described above, in some embodiments, video frames 305 are sampled from all video frames in the video at a certain rate. Each model or function of frame-level models and functions 315 extracts or identifies one or more types of frame-level features from video frames 305. In some embodiments, frame-level models and functions 315 include one or more of an OCR model 310, an object detection model 312, a logo detection model 314, a gun detection model 316, a violence detection model 318, a nudity detection model 320, and an image vector extraction model 322. In some embodiments, some frame-level models and functions 315 are based on convolutional neural networks (CNNs), including any variations or extensions of CNN with modified architectures, such as GoogLeNet, VGGnet, ResNet, ResNeXt, DenseNet, and the like.

OCR model 310 includes, for example, a convolutional neural network (CNN) that is trained to identify a string of character from the image of a video frame 305. Object detection model 312 also includes, for example, a CNN model that is trained to recognize one or more objects in a list of target objects from the image of a video frame. The list of target objects can be provided to the user or can be provided, modified, or augmented by the user. In some embodiments, object detection model 312 also generates a confidence score for each respective identified object in a video frame.

Logo detection model 314 is used to predict the presence of one or more brand logos and/or their respective coordinates in the image of each video frame. In some embodiments, logo detection model 314 includes two successive or parallel logo detection models to maximize the probability of identifying brand logos inside a video frame. A first logo detection model is trained using a training dataset that includes certain types of logos, and thus is able to detect these types of logos if they are present in the video frames. The list of target types of logos can be provided to the user or can be generated, modified, or augmented by the user. A second logo detection model is trained to identify regions in each video frame that are likely to include a logo, but the logo may or may not be one of the logos that the first logo detection model has been specifically trained to detect. The second logo detection model then tries to predict the logo in each of the identified regions in the video frame. The first logo detection model and the second logo detection model can process the image of a video frame sequentially or in parallel. In some embodiments, each of the two logo detection models includes, for example, a region-based convolutional neural network (R-CNN), a fast R-CNN network, or a faster R-CNN network. The output of logo detection model 314 includes a list of logos identified in a video frame and/or the corresponding confidence scores.

Gun detection model 316 includes, for example, a CNN model which takes the image of a video frame as input and generates a scalar value indicating the confidence level that the video frame includes one or more firearms (e.g., guns) in the image. The CNN model in Gun detection model 316 can be trained using training images that includes different types of firearms. Violence detection model 318 includes, for example, a CNN model which takes the image of a video frame as input and generates a scalar value indicating the confidence level that the video frame includes violent content in the image. Nudity detection model 320 includes, for example, a CNN model which takes the image of a video frame as input and generates a scalar value indicating the confidence level that the video frame includes nudity content in the image. Image vector extraction model 322 includes, for example, a CNN model which takes the image of a video frame as input and generates a vector representing the features of the image.

Scene-level models and functions 325 use outputs generated by various frame-level models and functions 315 from video frames 305 in a scene of the video as inputs, and aggregates or otherwise generates scene-level features. In some embodiments, some scene-level models and functions 325 also use scene-level video data (e.g., audio data and time sequence data) as inputs to extract scene-level features. In the example shown in FIG. 3, scene-level models and functions 325 include one or more of an OCR aggregator function 332, an entity extraction model 334, a brand extraction model 336, an object aggregator function 340, a logo aggregator function 342, a gun aggregator function 344, a nudity aggregator function 346, a violence aggregator function 348, and a vector aggregator function 350.

In some embodiments, OCR aggregator function 332 includes a linear function that generates a string based on outputs from OCR model 310. Entity extraction model 334 includes, for example, a Natural Language Toolkit (NTLK) utility function and an association-rule model. Entity extraction model 334 is configured to identify a list of entities based on the string (text) generated by OCR aggregator function 332 and audio data in the scene. Brand extraction model 336 includes, for example, a fuzzy search model that is trained to identify a list of brands based on a list of entities, such as the list of entities generated by entity extraction model 334. Unsafe language search model 338 includes, for example, a NTLK utility and fuzzy match model. Unsafe language search model 338 is trained to generate a list of unsafe words with the corresponding frequencies of occurrences based on a string aggregated from outputs of OCR model 310 (e.g., the output string of OCR aggregator function 332) and audio data in the scene.

Object aggregator function 340 includes, for example, a linear function. Object aggregator function 340 uses the outputs of object detection model 312 to identify a list of objects with the corresponding confidence scores. Logo aggregator function 342 includes, for example, a linear function that can determine a list of logos with the corresponding confidence scores based on, for example, outputs of logo detection model 314. Gun aggregator function 344 includes, for example, a linear function. The input of the linear function includes, for example, the outputs of gun detection model 316, and the output of the linear function includes a scalar value that indicates the confidence level that guns show up in the scene. Nudity aggregator function 346 includes, for example, a linear function that uses the outputs of nudity detection model 320 to generate a scalar value indicating the confidence level that a scene of the video includes nudity content. Violence aggregator function 348 includes, for example, a linear function that uses the outputs of violence detection model 318 to determine a scalar value indicating the confidence level that the scene of the video includes violent content. Vector aggregator function 350 includes, for example, a linear function that uses outputs of image vector extraction model 322 to generate a feature vector for the scene.

Based on the scene-level features extracted or generated by scene-level models and functions 325, video-level models and functions 335 aggregates or otherwise generates video-level features, including a list of unsafe components in the video and a safety score for the video. In various embodiments, video-level models and functions 335 include one or more of an object aggregator function 362, a violence aggregator function 364, a theme recognition model 366, a sentiment detection model 368, a hate speech detection model 370, a nudity aggregator function 372, an unsafe language aggregator function 374, an OCR aggregator function 376, a logo aggregator function 378, a gun aggregator function 380, a brand aggregator function 382, a video topic model 384, and a safety score model 386.

OCR aggregator function 376 includes, for example, a linear function that uses outputs from OCR aggregator function 332 to determine a string. Video topic model 384 includes, for example, a NTLK and/or a support vector machine (SVM) model. Video topic model 384 uses audio data in the video to classify the topic of the video. The result of video topic model 384 can include a class label indicating the classified topic of the video and/or a confidence score for the classification. Theme recognition model 366 includes, for example, a linear function and/or an SVM model. Theme recognition model 366 uses output of vector aggregator function 350 for different scenes in the video to determine the theme of the video. Sentiment detection model 368 includes, for example, an open source natural language processing (NLP) model and/or an SVM model to classify the sentiment of the video based on outputs of OCR aggregator function 376 and the audio data in the video. Sentiment detection model 368 can output a class label and a corresponding confidence score. Hate speech detection model 370 includes, for example, an open source NLP and/or an SVM model. Hate speech detection model 370 uses a string(text), such as the output of OCR aggregator function 376, and the audio data of the video to determine if the video includes a hate speech. Hate speech detection model 370 can generate a class label indicating whether the video includes a class of hate speech, and/or the corresponding confidence score for the classification.

Brand aggregator function 382 includes, for example, a linear function, where the input of the linear function includes outputs from brand extraction model 336 for different scenes in the video, and the output of the linear function includes a list of brands identified in the video. Unsafe language aggregator function 374 includes, for example, a linear function, where the input to the linear function includes outputs from unsafe language search model 338 for different scenes in the video, and the output of the linear function includes a list of unsafe words and/or the corresponding numbers of occurrences in the video. Object aggregator function 362 includes, for example, a linear function and/or a fuzzy search function. Object aggregator function 362 uses outputs from object aggregator function 340 for the different scenes in the video to generate a list of unsafe objects in the video and/or the respective confidence scores. Logo aggregator function 378 includes, for example, a linear function that uses outputs from logo aggregator function 342 for different scenes in the video to determine a list of logos and the corresponding confidence scores. Gun aggregator function 380 includes, for example, a linear function that uses outputs from gun aggregator function 344 for different scenes in the video to generate a scalar value indicating the confidence level that the video includes firearms (e.g., guns). Nudity aggregator function 372 includes, for example, a linear function that uses outputs from nudity aggregator function 346 for different scenes in the video and generates a scalar value indicating the confidence level that the video includes nudity content. Violence aggregator function 364 includes, for example, a linear function that uses outputs from violence aggregator function 348 for different scenes in the video to generate a scalar value indicating the confidence level that the video includes violent content.

Safety score model 386 include, for example, a linear function that uses outputs from, for example, video topic model 384, theme recognition model 366, sentiment detection model 368, hate speech detection model 370, brand aggregator function 382, unsafe language aggregator function 374, object aggregator function 362, logo aggregator function 378, gun aggregator function 380, nudity aggregator function 372, violence aggregator function 364, and the like. The output of the linear function of safety score model 386 includes a scalar value (e.g., safety score) indicating how safe the video is for associating with a brand. As described above, the safety score may be decreased for each unsafe items or each category of unsafe items identified in the video. In some embodiments, different weights are assigned to different categories of unsafe items, such that the safety score may be decreased by different values for items in different categories of unsafe items. The output of safety score model 386 is sent out the user as a part of final result 345. In some embodiments, final result 345 also includes details of how the safety score is determined based on the unsafe content (e.g., a list of unsafe or inappropriate objects, words, brands, logos, and the like) identified in the video. As described above, the list can be provided to the user or can be generated, modified, or augmented by the user.

Figure 4:
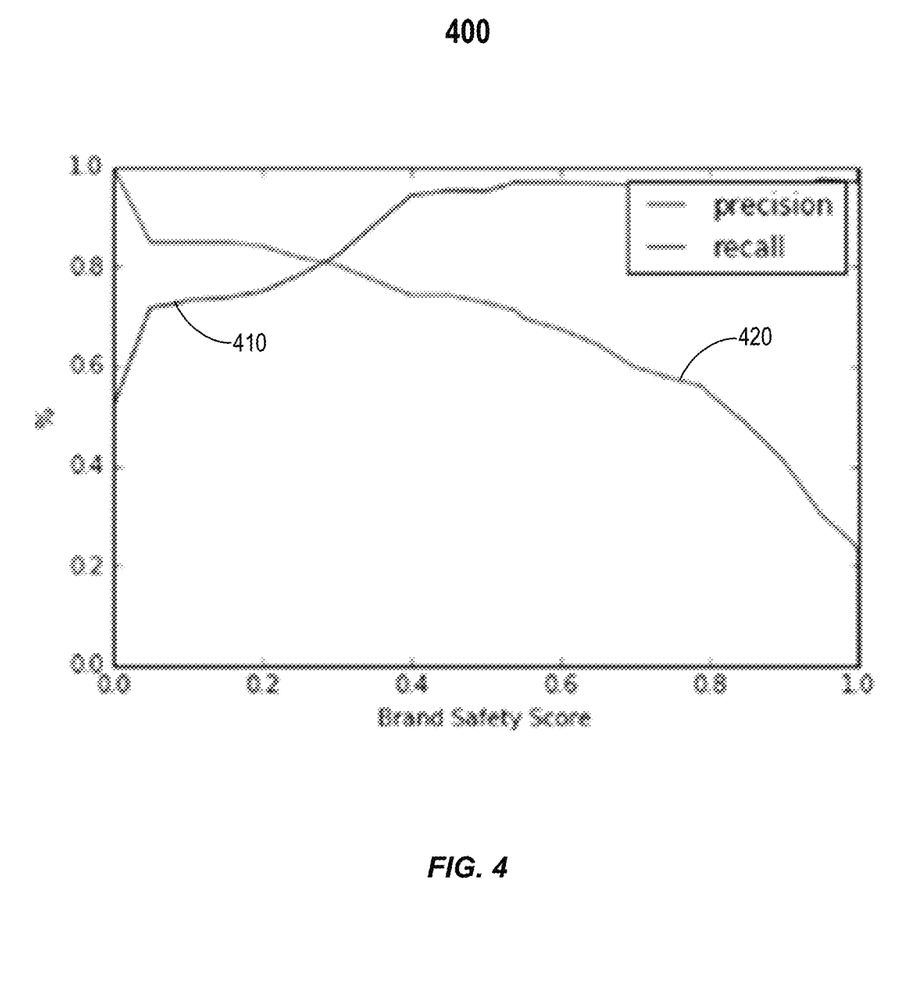
FIG. 4 shows an example of experimental results of brand safety scores for a video dataset including multiple videos using techniques disclosed herein according to certain embodiments.

FIG. 4 is a diagram 400 showing experimental results of brand safety scores for a collected dataset including multiple videos deemed unsafe for different reasons using techniques disclosed herein. In the experiment, a threshold is used to indicate if the video is safe or not. If the score is above a given threshold, the video is considered safe. If the score is below the given threshold, the video is considered unsafe. FIG. 4 shows a curve 410 indicating the change in precision when the threshold value changes, and a curve 420 indicating the change in recall (or sensitivity) when the threshold value changes. From FIG. 4, how different thresholds affect the results of the overall brand safety determination can be determined and appropriate threshold can be determined.

It is noted that the models may have different performance for different scenarios. For example, videos that are more explicitly unsafe, such as including nudity, violence, or extremist content, may have a very high accuracy (>95%), while videos that are more subjective may have a worse performance. This may be due to the fact that, in the borderline cases, brand safety is hard to accurately determined. Some videos may need a moral judgement and the opinion can vary from person to person.

The above-described techniques may be implemented using an application program interface (API). To determine brand safety of a video, the API may first obtain the video file, for example, by receiving user uploaded video file directly or by receiving the URL of the video and then fetching the video file from the web address specified by the URL. After a video is obtained, an ID may be provided to the user for the user to retrieve the status of the analysis. The ID can also be used to retrieve the full brand safety report after the analysis is done.

In some embodiments, caching mechanism based on URLs is provided. In this way, if multiple requests for the same URL are submitted, the API may only analyze the first one, and, for every subsequent request, the result of the previous analysis may be provided to the user in a short time period, such as in milliseconds.

There may be various ways to use the brand safety analysis and score. In some use cases where the user does not want to treat various brand safety red flags differently, the overall brand safety score alone may be used to determine whether or not a piece of content is brand safe and, for example, is suitable for monetization or publishing. By applying a threshold, one can filter out any videos that do not meet certain brand safety score criteria. In some embodiments, the threshold can be adjusted based on how conservative the user or brand wishes to be when it comes to brand safety.

On the other hand, when the user has more specific brand safety requirements and wants to treat the various brand safety concerns differently, the user can parse the results for specific red flags and, for example, blacklist those videos in which the relevant issues have been identified. For instance, a given user may view violence and nudity as unsafe but may be indifferent to firearms or alcohol. In such a case, the user can parse the results for violence and nudity red flags and blacklist only the videos in which violence and nudity have been observed. This may be a more targeted approach and may be much more effective when the requirements are clear and known prior to the analysis.

Figure 5:
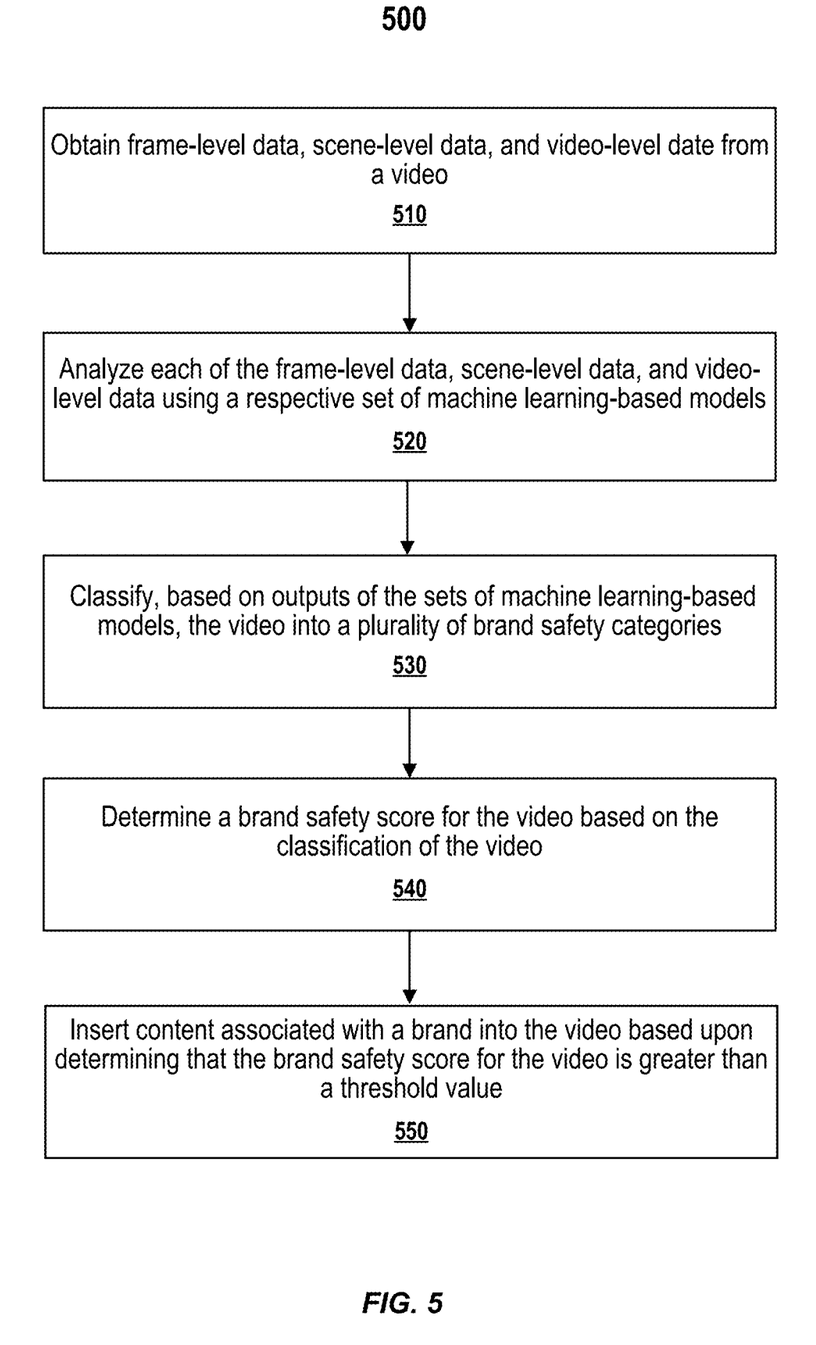
FIG. 5 illustrates an example of a method for determining brand safety of a video according to certain embodiments.

FIG. 5 is a flow chart 500 illustrating an example of a method for determining brand safety of a video according to certain embodiments. Operations in flow chart 500 can be performed by one or more processing devices, such as a computing system 800 described below with respect to FIG. 8. In some embodiments, the one or more processing devices may implement one or more neural networks for one or more machine learning-based models. In some embodiments, operations in flow chart 500 can be performed by one or more servers in a cloud computing environment as described below with respect to FIG. 7. In some embodiments, the one or more processing devices may implement one or more neural networks for one or more machine learning-based models. Even though FIG. 5 describes the operations in a sequential flow, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

At block 510, the one or more processing devices obtain a video file. The video file may include image frames and audio content (e.g., a sound track). In some embodiments, the video file may include some metadata. The one or more processing devices can obtain frame-level data (e.g., images of some video frames in the video), scene-level data (e.g., audio data and/or time sequence data), and video-level data (e.g., audio data and/or time sequence data) from the video as described above with respect to FIGS. 1-3.

At block 520, the one or more processing devices analyze each of the frame-level data, scene-level data, and video-level data using a respective set of machine learning-based models as described above with respect to FIGS. 2 and 3. For example, a set of frame-level models can analyze the frame-level data to extract frame-level features. A set of scene-level models can analyze the scene-level data and/or aggregate the frame-level features extracted by the set of frame-level models to generate scene-level features. A set of video-level models can analyze the video-level data and/or aggregate the scene-level features extracted by the set of scene-level models to generate video-level features for the video.

At block 530, the one or more processing devices classify the video into a plurality of brand safety categories and based on outputs of the sets of machine learning-based models. For example, as described above, the categories may indicate different brand safety concerns (or "red flags"), such as unsafe tags, unsafe language, identified brands, NSFW, and sentiment. The one or more processing devices can classify one video into multiple categories if the video include different types or categories of unsafe items or components.

At block 540, the one or more processing devices determine a brand safety score for the video based on the results at blocks 530 and/or 520, such as the classification results at block 530. For example, each instance of unsafe tags, unsafe language, identified brands, and NSFW material identified in the video may cause a reduction in the brand safety score for the video. In some embodiments, different unsafe tags, different unsafe language words, and different NSFW materials may have different weights for determining the brand safety score for the video. In some embodiments, if the video's sentiment is predicted to be highly negative, the brand safety score is reduced as well.

Optionally, at block 550, if the brand safety score for the video is greater than a threshold value, the one or more processing devices insert content associated with a brand (e.g., an advertisement for the brand) into the video. If the brand safety score for the video is lower than a threshold value, the video may be reported as unsafe for at least some brands and the video may not be used for monetization or publishing.

Figure 6:
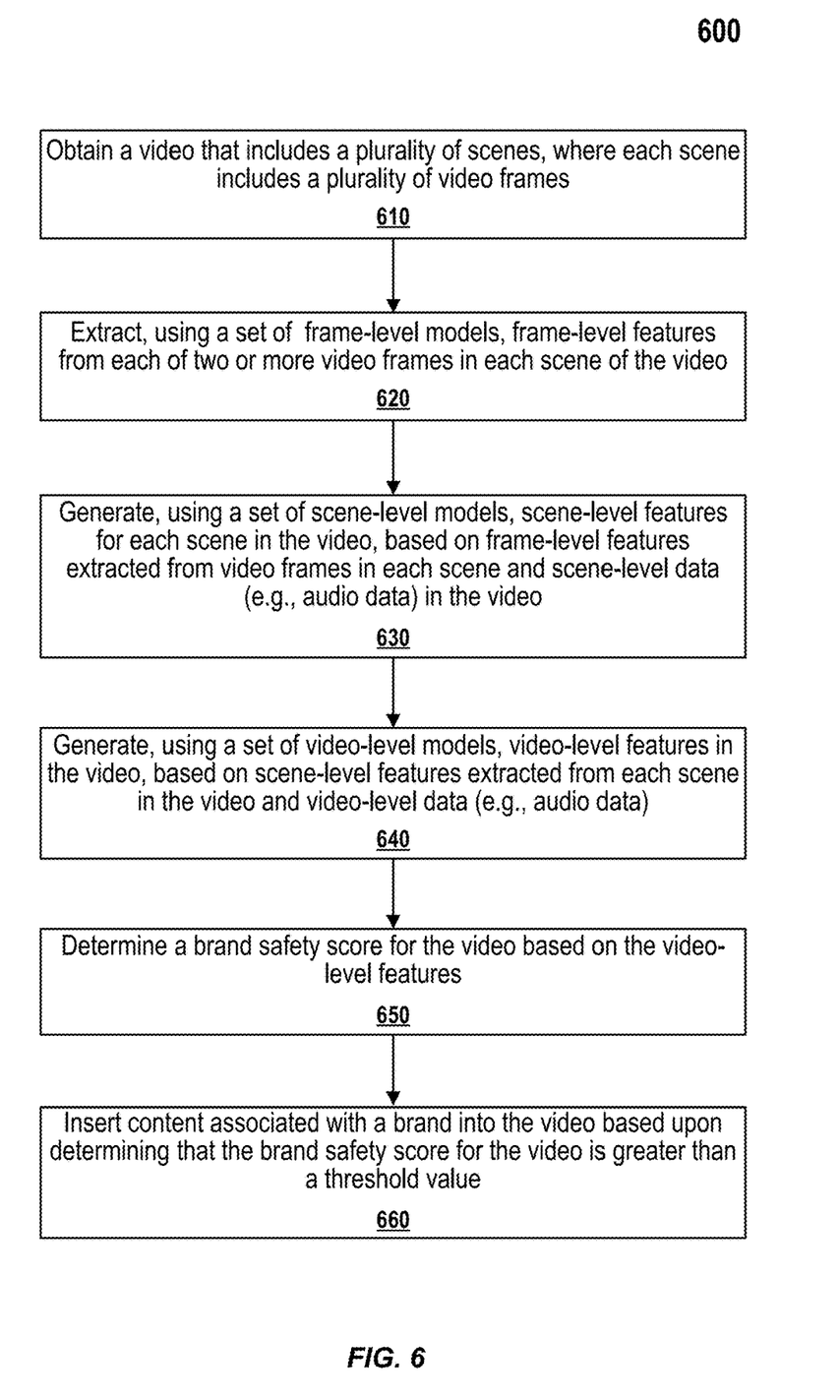
FIG. 6 illustrates an example of a method for determining brand safety of a video according to certain embodiments.

FIG. 6 is a flow chart 600 illustrating an example of a method for determining brand safety of a video according to certain embodiments. Operations in flow chart 600 can be performed by one or more processing devices, such as a computing system 800 described below with respect to FIG. 8. In some embodiments, the one or more processing devices may implement one or more neural networks for one or more machine learning-based models. In some embodiments, operations in flow chart 600 can be performed by one or more servers in a cloud computing environment as described below with respect to FIG. 7. In some embodiments, the one or more processing devices may implement one or more neural networks for one or more machine learning-based models. Even though FIG. 6 describes the operations in a sequential flow, some of the operations may be performed in parallel or concurrently. Some operations may be performed in a different order. An operation may have additional steps not included in the figure. Some operations may be optional, and thus may be omitted in various embodiments. Some operations may be performed together with another operation. Furthermore, embodiments of the methods may be implemented in hardware, software, firmware, middleware, microcode, hardware description languages, or any combination thereof.

At block 610, the one or more processing devices obtain a video file. The video file can be uploaded or otherwise provided by a user or can be obtained from a website or a data store. The video file includes image frames and audio content (e.g., a sound track). In some embodiments, the video file may include some metadata. The video file includes a plurality of scenes, where each scene includes a plurality of video frames, such as hundreds or thousands of frames.

At block 620, a set of one or more frame-level models is used to extract frame-level features from each video frame of two or more video frames in each scene of the video. The two or more video frames can be sampled from all video frames in each scene or can include all video frames in each scene. As described above, the one or more frame-level models can include any combinations of, for example, OCR model 310, object detection model 312, logo detection model 314, gun detection model 316, violence detection model 318, nudity detection model 320, and image vector extraction model 322. Each of the frame-level models can include a CNN trained using training data, such as training images with known objects, logos, guns, nudity content, violent content, brands, or the like in the training images identified and annotated. The frame-level features includes, for example, characters, strings, objects in a list of objects, logos, brands, weapons (e.g., guns), nudity content, violent content, and the like. The CNN can be any variations or extensions of CNN with modified architectures, such as GoogLeNet, VGGnet, ResNet, ResNeXt, DenseNet, R-CNN, Fast R-CNN, and the like. The CNN can be trained using images with unsafe content (e.g., a list of unsafe or inappropriate objects, words, brands, logos, guns, and the like). As described above, the list of unsafe content can be provided to the user or can be provided, modified, or augmented by the user.

At block 630, a set of one or more scene-level models is used to generate scene-level features for each scene in the video based on frame-level features extracted from two or more video frames in each scene at block 620 and scene-level data (e.g., audio data) in the video. As described above, the one or more scene-level models can include any combinations of, for example, OCR aggregator function 332, entity extraction model 334, brand extraction model 336, object aggregator function 340, logo aggregator function 342, gun aggregator function 344, nudity aggregator function 346, violence aggregator function 348, and vector aggregator function 350. The scene-level features can include, for example, strings, entities, brands, objects, logos, weapons (e.g., guns), nudity contents, violent content, and the like in the scene. The set of one or more scene-level models can extract some scene-level features from the scene-level data, aggregate the results generated by the frame-level models for the two or more video frames in the scene, and generate a list of scene-level features and the corresponding confidence levels and/or frequencies (or numbers) of occurrences of the scene-level features in the scene.

At block 640, a set of video-level models is used to generate video-level features in the video based on scene-level features extracted from each scene in the video and video-level data (e.g., audio data). As described above, the one or more video-level models can include any combinations of, for example, object aggregator function 362, violence aggregator function 364, theme recognition model 366, sentiment detection model 368, hate speech detection model 370, nudity aggregator function 372, unsafe language aggregator function 374, OCR aggregator function 376, logo aggregator function 378, gun aggregator function 380, brand aggregator function 382, video topic model 384, and safety score model 386. The video-level features can include strings, entities, brands, objects, logos, weapons (e.g., guns), nudity contents, violent content, topic, theme, sentiment, hate speeches, unsafe languages, and the like in the scene. The set of one or more video-level models can extract some video-level features from the video-level data, aggregate the results generated by the scene-level models for each scene in the video, and generate a list of video-level features and the corresponding confidence levels and/or frequencies (or numbers) of occurrences of the video level features.

At block 650, a safety score model (e.g., safety score model 386) is used to generate a brand safety score for the video based on the video-level features generated by the video-level models. For example, instances of unsafe tags (e.g., objects such as cigarette and alcohol, unsafe themes, unsafe topics, etc.), unsafe language (e.g., profane or hate speeches), unsafe logos or brands (e.g., competitor brands or brands associated unsafe objects), guns, NSFW material (e.g., nudity or violent content), negative sentiment, and other unsafe items or components identified in the video may cause a reduction in the brand safety score for the video. In some embodiments, different unsafe objects, different unsafe language words, and different NSFW materials, and the like may have different weights for determining the brand safety score for the video.

At block 660, if the brand safety score for the video is greater than a threshold value, the one or more processing devices can insert content associated with a brand (e.g., advertisement for the brand) into the video. If the brand safety score for the video is lower than a threshold value, the video may be reported as unsafe for at least some brands and may not be used for monetization for at least some brands.

Figure 7:
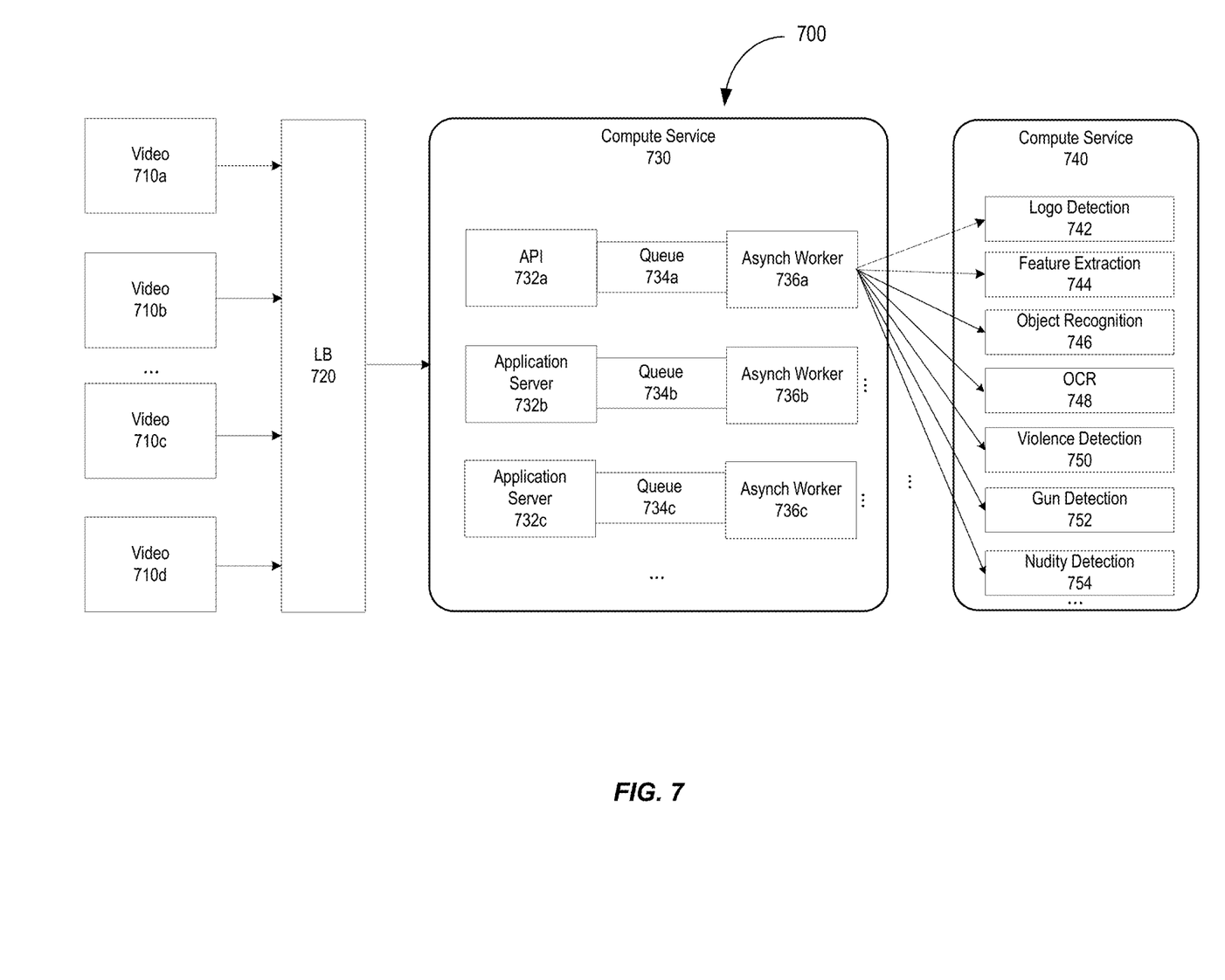
FIG. 7 illustrates an example of a system environment for implementing some of the embodiments disclosed herein.

FIG. 7 illustrates an example of a system environment 700 for implementing some of the embodiments disclosed herein. System environment 700 may be implemented in a cloud computing environment, such as Amazon Web Service (AWS). Videos 710a, 710b, 710c, 710d, and the like, or images may be submitted to a server through a website. The videos or images may be distributed to different application servers in a compute service 730 through a load balancer 720. One example of compute service 730 is Amazon Elastic Compute Cloud (EC2). Each application server in compute service 730 may be responsible for handling the API workflow, the authorization workflow, and the asynchronous orchestration of the image processing jobs. The application server may also capture frames of images from a video. Each application server in compute service 730 may include an application programming interface (API) (e.g., API 732a, 732b, or 732c), a queue (e.g., queue 734a, 734b, or 734c), and an asynchronous worker (e.g., async worker 736a, 736b, or 736c). The asynchronous worker may be configured to send image processing jobs in the queue to a compute service 740 that may include a pool of applications. One example of compute service 740 is AWS Lambda.

Each application (which may sometimes be referred to as a worker) in the pool of applications hosted by compute service 740 may be a program that implements certain processing steps. Each application may be built using different programming languages (e.g., python or Java), and may reuse existing applications to create new applications. The applications may be implemented using cloud services, enterprise applications, legacy systems, or scripts. The number of workers for processing each type of tasks may be independently controlled to control the throughput of the applications. The applications may be hosted by one or more servers. In some embodiments, the applications may implement one or more neural networks. Examples of applications hosted by compute service 740 can implement the frame-level models and functions, scene-level models and functions, and video-level models and functions described above, such as a logo detection application 742, a feature extraction application 744, an object recognition application 746, an OCR application 748, a violence detection application 750, a gun detection application 752, a nudity detection application 754, and other applications not shown in FIG. 7.

Logo detection application 742 implements a logo detection model (e.g., logo detection model 314) as described above and can be used to detect and classify logo(s) in individual images as described above. Feature extraction application 744 can implement, for example, an image vector extraction model (e.g., image vector extraction model 322), and can be used to extract features from an image to generate a feature vector or embedding for the image. Object recognition application 746 can implement an object detection model (e.g., object detection model 312), and can be used to identify a list of target objects (which can include a default list of objects or can be specified, modified, or augmented by users). OCR application 748 can implement an OCR model (e.g., OCR model 310), and can be used to recognize textual data present inside individual video frames. Violence detection application 750 can implement, for example, a violence detection model (e.g., violence detection model 318), and can be used to detect violent content in a video frame. Gun detection application 752 can implement, for example, a gun detection model (e.g., gun detection model 316), and can be used to detect firearms (e.g., guns) in a video frame. Nudity detection application 754 can implement, for example, a nudity detection model (e.g., nudity detection model 320), and can be used to detect nudity content in a video frame. Other models or functions, such as scene-level models or functions and video-level models and functions, can also be implemented in applications hosted by compute service 740.

In some embodiments, system environment 700 may also include one or more storage servers (e.g., AWS Simple Storage Service (S3)) that can be used to store video files, image frames, audio files, or features (e.g., feature vectors) extracted from images of video frames.

Figure 8:
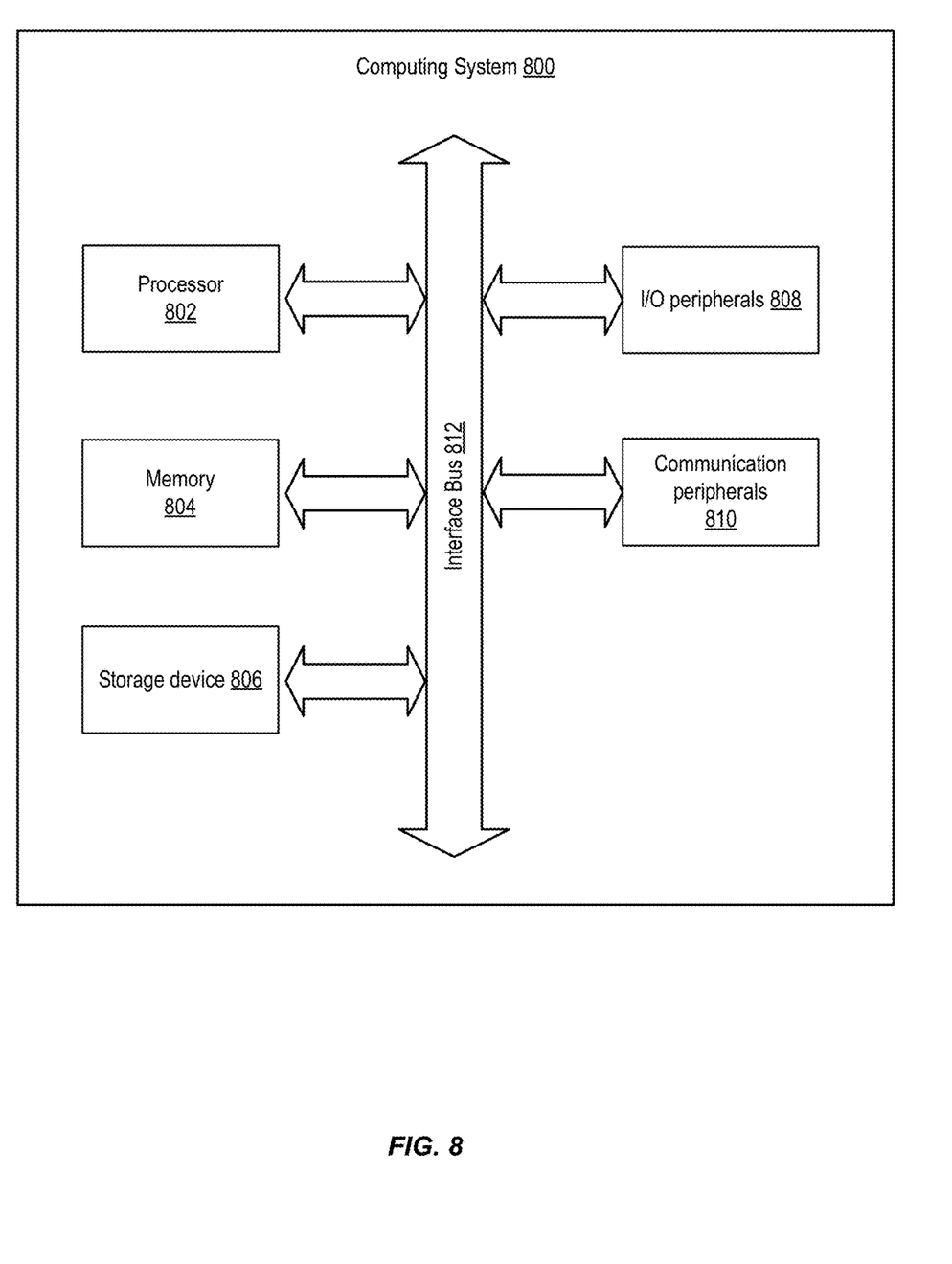
FIG. 8 illustrates an example computing system for implementing some of the embodiments disclosed herein.

Any suitable computing system or group of computing systems can be used for performing the operations described herein. For example, FIG. 8 depicts an example of the computing system 800.

The depicted example of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

A memory device 804 includes any suitable non-transitory computer-readable medium for storing program code 815, program data 816, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, an input device 820, a presentation device 818, or other input or output devices. For example, computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code 805 that configures the processor 802 to perform one or more of the operations described herein. The program code may be resident in the memory device 804 or any suitable computer-readable medium and may be executed by the processor 802 or any other suitable processor.

In some embodiments, one or more memory devices 804 store program data 807 that includes one or more datasets and models described herein. In some embodiments, one or more of data sets, models, and functions are stored in the same memory device (e.g., one of the memory devices 804). In additional or alternative embodiments, one or more of the programs, data sets, models, and functions described herein are stored in different memory devices 804 accessible via a data network.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device executing an environment evaluation system 102) via a data network using the network interface device 810.

In some embodiments, the computing system 800 also includes the input device 820 and the presentation device 818 depicted in FIG. 8. An input device 820 can include any device or group of devices suitable for receiving visual, auditory, or other suitable input that controls or affects the operations of the processor 802. Non-limiting examples of the input device 820 include a touchscreen, a mouse, a keyboard, a microphone, a separate mobile computing device, etc. A presentation device 818 can include any device or group of devices suitable for providing visual, auditory, or other suitable sensory output. Non-limiting examples of the presentation device 818 include a touchscreen, a monitor, a speaker, a separate mobile computing device, etc.

Although FIG. 8 depicts the input device 820 and the presentation device 818 as being local to the computing device that executes the environment evaluation system 102, other implementations are possible. For instance, in some embodiments, one or more of the input device 820 and the presentation device 818 can include a remote client-computing device that communicates with the computing system 800 via the network interface device 810 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method comprising, by one or more processing devices:
   obtaining a video, the video including a plurality of scenes, each scene including a plurality of video frames;
   extracting, using a first set of models implemented by the one or more processing devices, frame-level features from each of two or more video frames in each scene of the plurality of scenes;
   generating, using a second set of models implemented by the one or more processing devices, scene-level features for each scene of the plurality of scenes based on the frame-level features extracted from the two or more video frames in each scene of the plurality of scenes;
   generating, using a third set of models implemented by the one or more processing devices, video-level features in the video based on the scene-level features generated for each scene of the plurality of scenes; and
   determining a brand safety score for the video based on the video-level features, the brand safety score indicating whether it is safe to associate a brand with the video.

2. The method of claim 1, further comprising:
   determining that it is safe to associate the brand with the video based on determining that the brand safety score is greater than a threshold value; and
   inserting content associated with the brand into the video.

3. The method of claim 1, wherein the frame-level features include logos, firearms, violent content, nudity content, target objects, strings of characters, or feature vectors for video frames.

4. The method of claim 3, wherein the first set of models includes at least one of an object detection model, a logo detection model, a nudity detection model, a violence detection model, a gun detection model, an optical character recognition (OCR) model, or a feature vector extraction model.

5. The method of claim 3, wherein extracting the frame-level features includes extracting the frame-level features based on a list of target logos, firearms, or objects specified by a user.

6. The method of claim 1, wherein the second set of models includes at least one of an OCR aggregator function, an object aggregator function, a logo aggregator function, a gun aggregator function, a nudity aggregator function, a violence aggregator function, or a vector aggregator function.

7. The method of claim 1, wherein generating the scene-level features further includes generating the scene-level features based on audio content in each scene.

8. The method of claim 7, wherein the second set of models further comprises at least one of an entity extraction model, a brand extraction model, or an unsafe language search model, wherein the entity extraction model, brand extraction model, or unsafe language search model is configured to extract entities, brands, or unsafe language, respectively, from the audio content in each scene.

9. The method of claim 1, wherein the third set of models includes at least one of an OCR aggregator function, an object aggregator function, a logo aggregator function, a gun aggregator function, a nudity aggregator function, a violence aggregator function, a unsafe language aggregator function, a brand aggregator function, or a theme recognition model.

10. The method of claim 1, wherein the video-level features include at least one of:
    a list of unsafe objects in the video;
    a list of unsafe words in the video;
    a list of logos or brands in the video;
    a sentiment of the video;
    a topic of the video;
    a value indicating whether the video includes hate speech;
    a value indicating a confidence level that the video includes firearms;
    a value indicating a confidence level that the video includes violent content; or
    a value indicating a confidence level that the video includes nudity content.

11. The method of claim 1, wherein determining the brand safety score includes reducing the brand safety score at different rates for different types of video-level features.

12. The method of claim 1, wherein generating the video-level features further includes generating the video-level features based on audio content in the video.

13. The method of claim 12, wherein the third set of models further includes at least one of a video topic model, a sentiment detection model, or a hate speech detection model, wherein the video topic model, sentiment detection model, or hate speech detection model is configured to determine a topic, sentiment, or hate speech, respectively, based on the audio content in the video.

14. The method of claim 1, wherein the one or more computing devices include one or more cloud computing servers.

15. A system comprising:
a processing device; and
a non-transitory computer-readable medium communicatively coupled to the processing device, wherein the processing device is configured to execute program code stored in the non-transitory computer-readable medium and thereby perform operations comprising:
obtaining a video, the video including a plurality of scenes, each scene including a plurality of video frames;
extracting, using a first set of models implemented by the one or more processing devices, frame-level features from each of two or more video frames in each scene of the plurality of scenes;
generating, using a second set of models implemented by the one or more processing devices, scene-level features for each scene of the plurality of scenes based on the frame-level features extracted from the two or more video frames in each scene of the plurality of scenes;
generating, using a third set of models implemented by the one or more processing devices, video-level features in the video based on the scene-level features generated for each scene of the plurality of scenes; and
determining a brand safety score for the video based on the video-level features, the brand safety score indicating whether it is safe to associate a brand with the video.

16. The system of claim 15, wherein the operations further comprises:
determining that it is safe to associate the brand with the video based on determining that the brand safety score is greater than a threshold value; and
inserting content associated with the brand into the video.

17. The system of claim 15, wherein determining the brand safety score includes reducing the brand safety score at different rates for different types of video-level features.

18. A system comprising:
means for obtaining a video, the video including a plurality of scenes, each scene including a plurality of video frames;
means for extracting, using a first set of models implemented by one or more processing devices, frame-level features from each of two or more video frames in each scene of the plurality of scenes;
means for generating, using a second set of models implemented by the one or more processing devices, scene-level features for each scene of the plurality of scenes based on the frame-level features extracted from the two or more video frames in each scene of the plurality of scenes;
means for generating, using a third set of models implemented by the one or more processing devices, video-level features in the video based on the scene-level features generated for each scene of the plurality of scenes; and
means for determining a brand safety score for the video based on the video-level features, the brand safety score indicating whether it is safe to associate a brand with the video.

19. The system of claim 18, further comprising:
means for inserting content associated with the brand into the video based on determining that the brand safety score is greater than a threshold value.

20. The system of claim 18, where the means for generating scene-level features for each scene of the plurality of scenes further comprise means for generating scene-level features for each scene of the plurality of scenes based on audio content in each scene.

* * * * *